United States Patent
Sakraschinsky

(10) Patent No.: US 8,020,709 B2
(45) Date of Patent: Sep. 20, 2011

(54) FILTER ELEMENT

(75) Inventor: Michael Sakraschinsky, St. Ingbert (DE)

(73) Assignee: Hydac Filtertechnik GmbH, Sulzbach/Saar (DE)

( * ) Notice: Subject to any disclaimer, the term of this patent is extended or adjusted under 35 U.S.C. 154(b) by 334 days.

(21) Appl. No.: 12/223,400

(22) PCT Filed: Dec. 5, 2006

(86) PCT No.: PCT/EP2006/011627
§ 371 (c)(1),
(2), (4) Date: Jul. 30, 2008

(87) PCT Pub. No.: WO2007/104349
PCT Pub. Date: Sep. 20, 2007

(65) Prior Publication Data
US 2009/0008322 A1   Jan. 8, 2009

(30) Foreign Application Priority Data
Mar. 15, 2006   (DE) .......................... 10 2006 011 842

(51) Int. Cl.
*B01D 27/08* (2006.01)
*B01D 29/23* (2006.01)
(52) U.S. Cl. .......... 210/450; 210/442; 210/232; 210/342
(58) Field of Classification Search .................. 210/232, 210/450, 442, 342
See application file for complete search history.

(56) References Cited

U.S. PATENT DOCUMENTS 5,738,785 A * 4/1998 Brown et al. ................. 210/232
2005/0029184 A1 * 2/2005 Desmarais .................... 210/437

FOREIGN PATENT DOCUMENTS

| DE | 100 26 536 A1 | 11/2001 |
| DE | 103 48 301 A1 | 5/2005 |
| WO | WO 01/97949 A1 | 12/2001 |
| WO | WO 02/089948 A1 | 11/2002 |
| WO | WO 03/002229 A1 | 1/2003 |

* cited by examiner

*Primary Examiner* — Nam Nguyen
*Assistant Examiner* — Denise R Anderson
(74) *Attorney, Agent, or Firm* — Roylance, Abrams, Berdo & Goodman, LLP

(57) ABSTRACT

A filter element (1) has a filter pot (3) delimiting a cylindrical interior (5) and has a bottom part (7) with a fluid connection (11). A lid part (37) is opposite the bottom part. A filter medium (29) is adjacent to the inner wall of the filter pot (3) in the form of a hollow cylindrical body leaving the central region of the interior (5) free. Fluid passages (31) in the wall of the filter pot (3) surround the filter medium (29). A ring body (53) as a connecting part 10 between filter pot (3) and lid part (37) and has a jacket part (55) extending axially along the end section (57) of the filter pot (3). An end part (51) extends radially inward and spans the edge of the filter pot (3) and the edge of the lid part (37). On the end part (51) of the ring body (53) and on the lid part (37), interacting snap connectors (59, 61) are provided to form a snap connection between end part (51) and lid part (37).

8 Claims, 3 Drawing Sheets

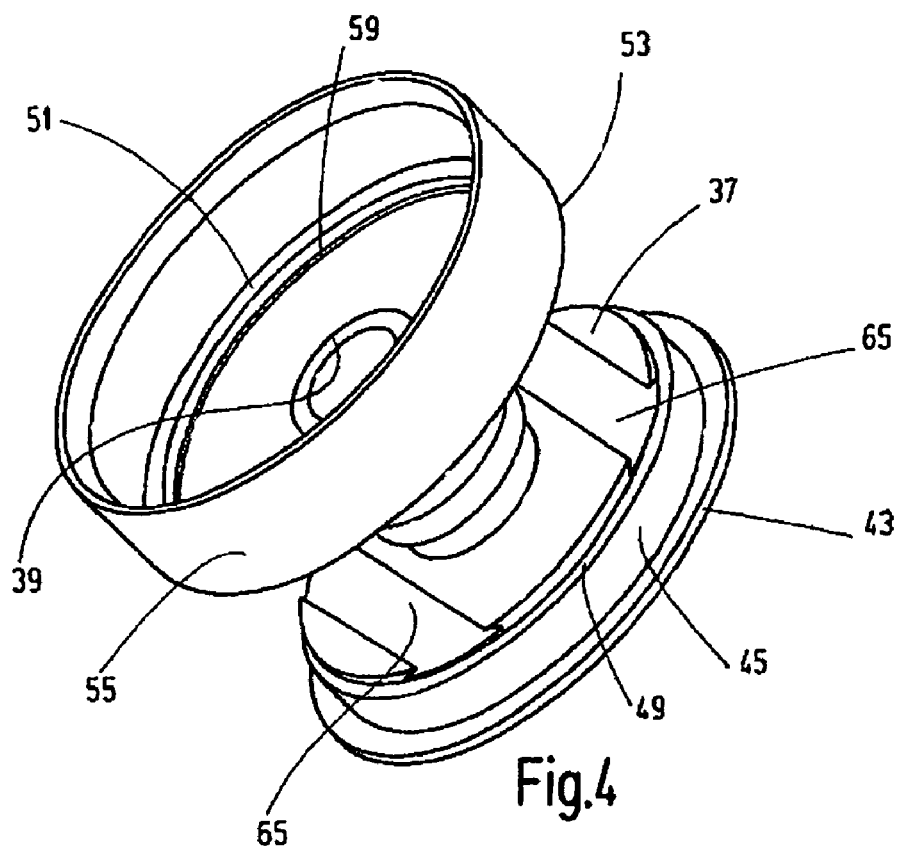
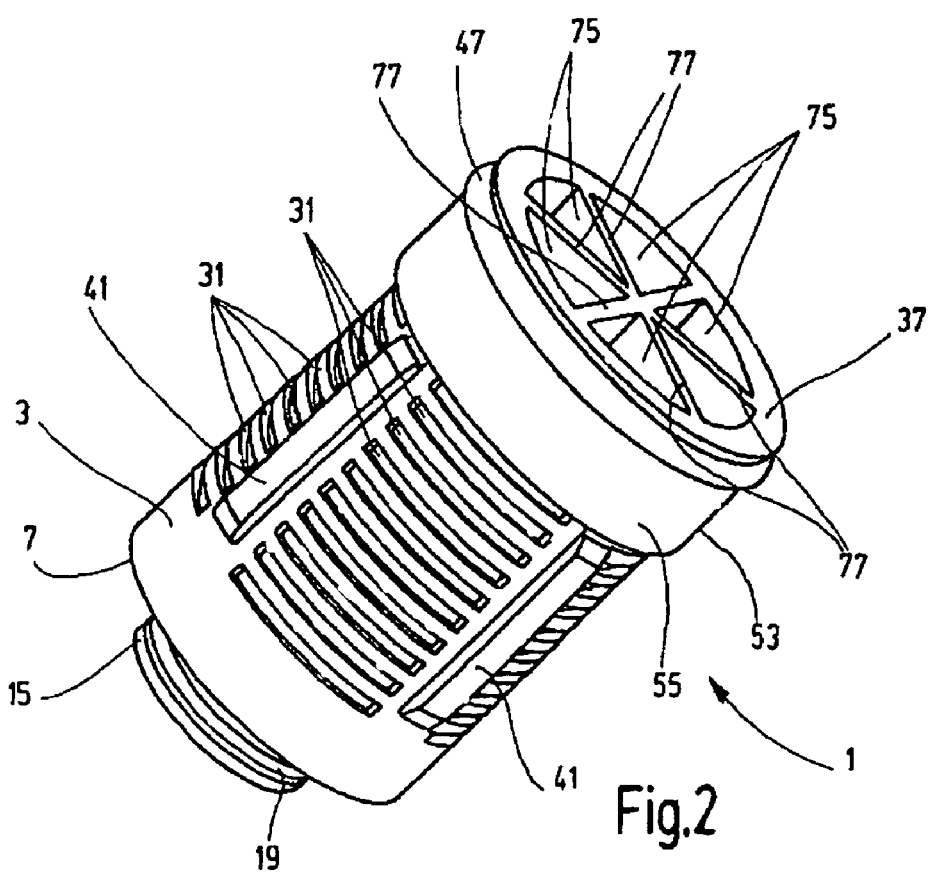

FILTER ELEMENT

FIELD OF THE INVENTION

The invention relates to a filter element having a filter pot delineating a circular cylindrical interior with a bottom part with a fluid port. A cover part is opposite the bottom part. A filter medium adjoins the inside wall of the filter pot in the form of a hollow cylindrical body and leaves the central region of the interior free. Fluid passages in the wall of the filter pot encompass the filter medium.

BACKGROUND OF THE INVENTION

Filter elements of this type are conventional. For use in assigned filter units, these filter elements, after opening or removing the housing cover, are inserted into a filter housing whose housing bottom has a seat for the fluid port located on the bottom part of the filter element. Via the seat, the fluid to be filtered enters the inner cavity of the filter element encompassed by the filter medium. The cleaned fluid emerges on the outside of the filter pot after flowing through the filter medium by the filter housing, preferably likewise on its bottom, having a fluid outlet.

Since such filter elements must be replaced by an unused filter element after an appropriate operating interval has passed, a design is desired which enables both simple and economical production and also simple handling. Disassembly and installation can then be easily done in a time-saving manner.

SUMMARY OF THE INVENTION

An object of the invention is to provide a filter element that is simple and economical to produce and that can be disassembled and installed easily and in a time saving manner.

This object is basically achieved according to the invention by a filter element having a ring body as a connecting part enabling a bond between the cover part and filter pot using a snap connection. The advantage of especially efficient and simple assembly of components of the filter element arises, and economical production is enabled.

In especially advantageous embodiments, the cover part on its periphery is made step-like. When the snap connection to the ring body has been established, its end part together with the pertinent step on the cover part then borders an annular groove forming a seat for an O-ring with which the cover part is sealed relative to the filter housing holding the filter pot.

This configuration, due to the double function of the ring body acting as a connecting element between the cover part and filter pot and at the same time forming part of the outer seal of the cover part, simplifies production to a particularly high degree.

In filter elements of this type, in the conventional manner at least on that end region of the filter medium adjacent to the cover part, there is an adhesive bond, and the cement material can be present as a binder both within the filter medium and can also form a bond to the cover part. In one advantageous embodiment of the invention, with respect to this end-side adhesive bond, the inside diameter of the jacket part of the ring body is chosen to be slightly larger than the outside diameter of the region of the filter pot surrounded by the jacket part. In the end section of the filter pot intended for the adhesive bond, between the outside of the filter pot and the inside of the jacket part of the ring body, an annular gap is then formed which is available for holding the cement material.

With respect to the adhesive bond, the cover part on its inside facing the interior of the filter pot can have at least one groove-like depression for holding cement material used to form the adhesive bond in the end region of the filter medium adjacent to the cover part.

Preferably, for this purpose two groove-like depressions extend parallel laterally from the central region of the cover part at a distance from one another and have a dovetail-like cross section so that the respective groove is widened on its base.

The subject matter of the invention is also a filter means intended to hold a filter element according to the invention.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure:

FIG. 2 is an oblique perspective view of the filter element of FIG. 1;

FIG. 4 is an exploded oblique perspective view of only the cover part and the ring body forming the components of the filter element of FIG. 1 on a larger scale and FIG. 5 is an enlarged side elevational view in section of the region designated as V in FIG. 3.

DETAILED DESCRIPTION OF THE INVENTION

Figure 1:
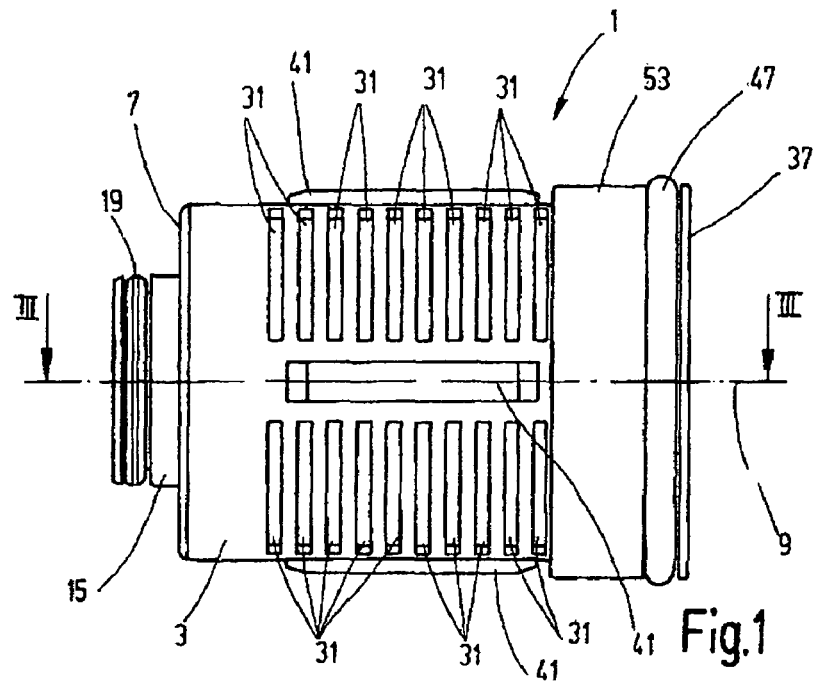
FIG. 1 is a side elevational view of a filter element according to one exemplary embodiment of the invention.
Figure 3:
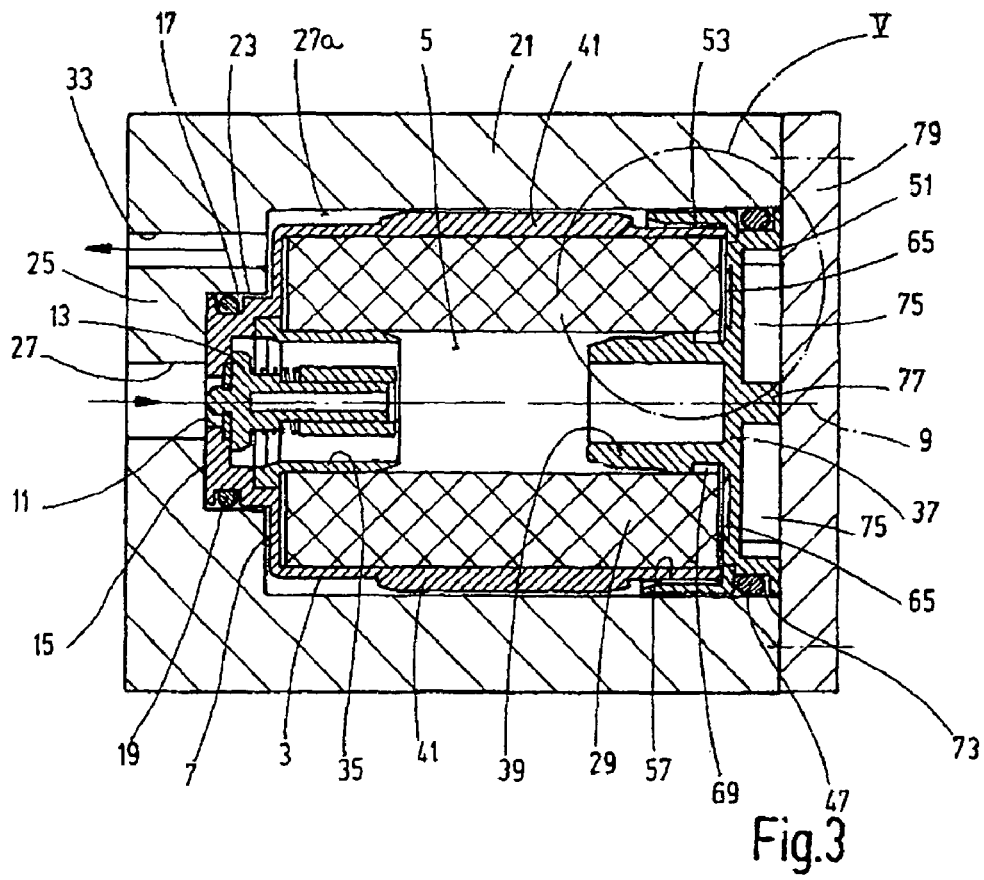
FIG. 3 is a side elevational view in section of the filter element taken along line III-III of FIG. 1, the filter element being inserted into a filter housing shown highly schematically simplified and likewise in a longitudinal section.

The filter element 1 in FIGS. 1 and 2, has a filter pot 3 made of a plastic material and bordering a circular cylindrical interior 5 for holding the filter medium 29. The interior on the bottom-side end is closed by a bottom part 7 in whose central region, referenced to the longitudinal axis 9, a fluid port 11 is provided. In the fluid port 11, a valve arrangement 13 of conventional design opens by fluid pressure. A shoulder 15 encompassing the fluid port 11 and projecting on the bottom part 7 concentrically to the longitudinal axis 9 has a peripheral annular groove 17 in which an O-ring 19 sits. When the filter element 1, as shown in FIG. 3, is inserted into the pertinent filter housing 21 and the insert 15 on the bottom part 7 of the filter element 1 is located in a seat 23 of the bottom 25 of the filter housing 21, the O-ring 19 seals the fluid port 11 and a fluid inlet 27 connected to it on the housing bottom 25 relative to the space 27a (FIG. 3). When the filter element 1 has been inserted into the filter housing 21, the outside of its filter pot 3 in the filtration process forms the clean side. In other words, the fluid to be filtered can be supplied into interior 5 via the fluid port 11 in the filtration process with interior 5 constituting the dirty side from which the fluid to be filtered passes through the filter medium 29 from the inside to the outside and travels through gap openings 31 (not all numbered in the figures) of the filter pot 3 to the space 27 forming the clean side. A fluid outlet 33 is connected to the space 27a in the bottom 25 of the filter housing 21 (FIG. 3).

As illustrated in FIG. 3, the valve arrangement 13 is located on the bottom part 7 of the filter pot 3 within the centering body 35 concentric to the longitudinal axis 9 and through which the fluid entering the interior 5 can flow. The filter medium 29 in the form of a hollow cylindrical body adjoins the inside wall of the filter pot 3 with its outside in its end region adjacent to the bottom part 7 and encompasses the centering body 35 defining the inside width of the interior 5. On the end opposite the bottom part 7, the filter pot 3 is sealed by a cover part 37 having a centering peg 39 concentric to the longitudinal axis 9. In a manner similar to the bottom-side centering body 35, centering peg 39 projects into the interior 5, similarly centers the filter medium 29 and defines the inside width of the interior 5 in the cover-side region.

Figure 5:
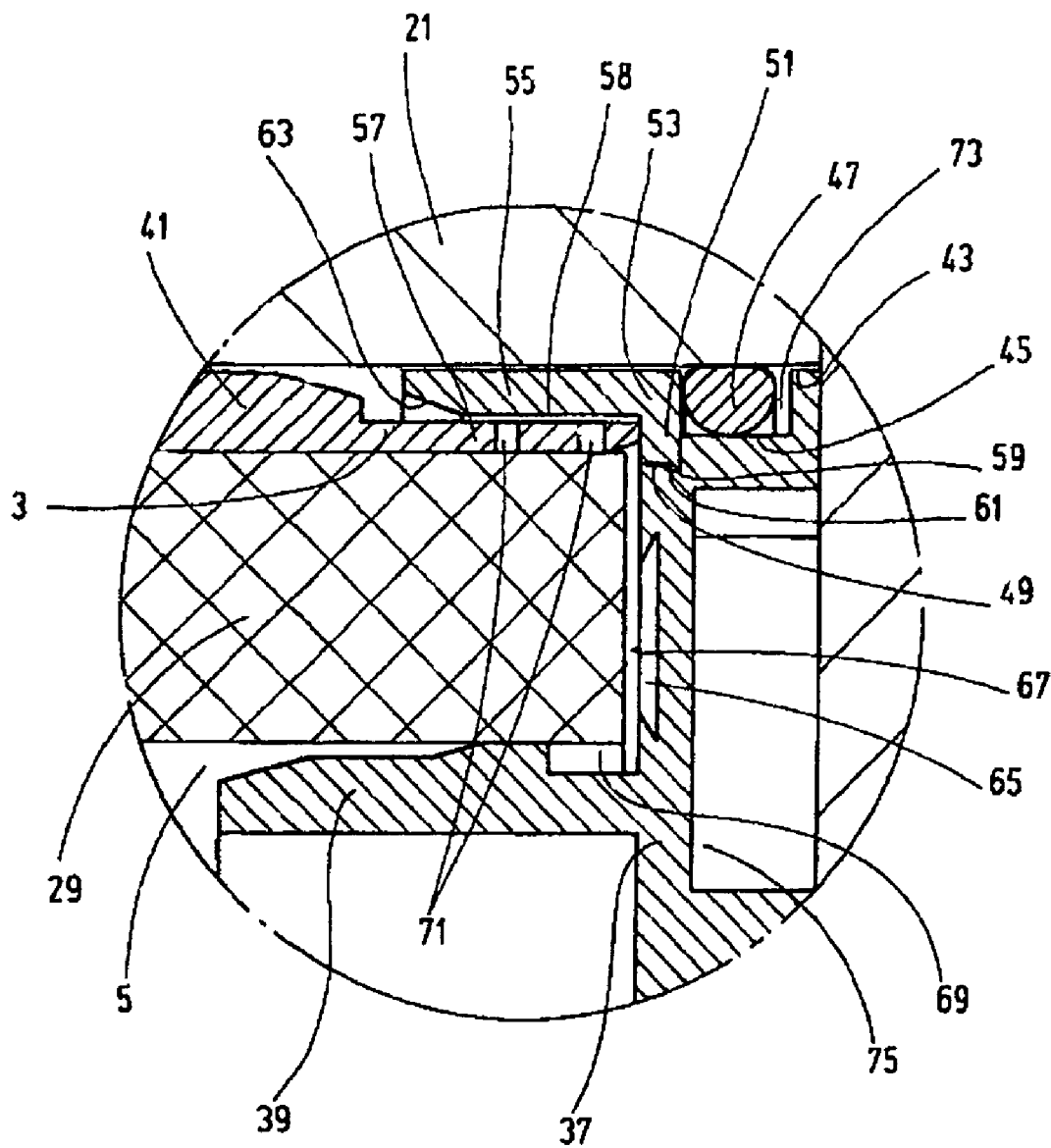

As illustrated in FIGS. 3 and 5, the longitudinal ribs 41 projecting between the slot openings 31 on the outside of the filter pot 3 form spacers which, when the filter element 1 has been inserted into the filter housing 21, keep the outside of the filter pot 3 at a distance from the inside wall of the chamber of the filter housing 21. The outside of the filter pot 3 then forms space 27a for the cleaned fluid.

FIG. 3 and especially FIG. 5 show details of the cover part 37. The cover part 37 is stepped on the outer peripheral side, with a first step 43 on the outer end having the greatest radial distance from the longitudinal axis 9 and on the cover part 37 defining the same outside diameter as the longitudinal ribs 41 on the filter pot 3. The adjoining second step 45 is offset to the inside by the radial distance. The axial dimension of this second step 45 is matched to the size of an O-ring received on this step 45. The radial distance between the first step 43 and the second step 45 is selected such that the O-ring 47 has the slightly compressed shape shown in FIGS. 3 and 5 when it is sealed to the inside wall of the assigned filter housing 21, as is shown in FIGS. 3 and 5. The third step 49 follows next farther inside, is in turn offset radially to the inside and forms a seat for the end part 51 of the ring body 53. This ring body 53 is made of a plastic material and has a hollow cylindrical jacket part 55 extending along one end section 57 of the filter pot 3. The inside diameter of the jacket part 55 is chosen to be somewhat larger than the outside diameter of the end section 57, so that between them an annular gap 58 is formed, see FIG. 5. The end part 51 of the ring body 53 is drawn or extends radially to the inside so that it overlaps the end edge of the filter pot 3 and sits with the radially inner ring surface on the third step 49 of the cover part 37. As FIGS. 4 and 5 show, on the radially inner ring surface of the end part 51, a radially projecting annular rib 59 snaps into an annular groove 61 in the third step 49 of the cover part 37 with the formation of a snap connection.

As seen from FIG. 5, the ring body 53 on its end facing away from the end part 51 has a bevel 63 widening the annular gap 58. The annular gap 58 together with the bevel 63 forms a receiving space for the cement material forming part of the adhesive bond provided in the end section 57. Furthermore, in the side of the cover part 37 facing the filter medium 29 groove-like depressions 65 extend parallel to one another to both sides of the centering peg 39 and have a dovetail-shaped cross section so that widening results on the groove base. These depressions together with the free space 67 bordering the filter medium 69, and with an annular space 69 on the base of the centering peg 39, form receiving spaces for cement material for forming the adhesive bond located between the cover part 37 and the filter element 29, the ring body 53 and the filter pot 3. Through openings 71 in the end section 57 of the filter pot 3 can form a passage for cement material between the inside of the filter pot 3 and the annular gap 58.

The snap connection between the ring body 53 and the cover part 37 by the annular rib 59 and the groove 61 enables simple and comfortable fixing of the components, for example prior to final attachment and adhesive bonding. Because the end part 51 of the ring body 53 axially borders the second step 45 on the periphery of the cover part 37, the ring body 53 forms not only a connecting element between the cover part 37 and filter pot 3, but at the same time together with the step 45 defines the annular groove 73 for the O-ring 47.

As is shown best in FIG. 2, on the outside of the cover part 37 circular sector-like recesses 75 are provided and separated by spoke-like ribs 77 with which the cover part adjoins the corresponding cover 79 of the filter housing 21.

FIG. 3 shows that the closed cover 79 of the filter housing 21, when the filter element 1 has been inserted into it and its fluid port 11 is located in the seat 17 in the bottom 25 of the filter housing 21, with its inside adjoins the ribs 77 on the outside of the cover part 37. The filter element 1 is thus fixed securely in position within the filter housing 21.

While one embodiment has been chosen to illustrate the invention, it will be understood by those skilled in the art that various changes and modifications can be made therein without departing from the scope of the invention as defined in the appended claims.

What is claimed is:

1. A filter element, comprising:
   a filter pot delineating a circular cylindrical interior with an inside wall and having a bottom part with a fluid port and a cover part opposite the bottom part;
   a filter medium adjoining said inside wall of said filter pot and being a circular cylindrical body with a central region forming a free interior;
   fluid passages in said inside wall of said filter pot encompassing said filter medium;
   a ring body connecting said cover part and said inside wall of said filter pot, said ring part having a jacket part extending axially along an end section of said inside wall and having an end part overlapping an end edge of said inside wall and an edge of said cover part and extending radially inwardly;
   interacting first and second catches on said end part of said ring body and on said cover part, respectively, forming snap connection between said end part and said cover part, said first catch being a radially projecting rib, said second catch being an annular groove; and
   a stepped periphery on said cover part having first, second and third steps proceeding in order from an outer end of said cover part, said first step having an outside diameter corresponding to an outside diameter of said jacket part, said second step being radially inside said first step, said third step being offset radially inwardly of said second step, said annular groove being machined into said third step, said second step having radial and axial dimensions such that, with said ring body connected to said cover part and said inside wall, said end part of said ring body with said second step form an annular groove providing a seal for an O-ring to seal said cover part relative to a filter housing holding said filter pot.

2. A filter element according to claim 1 wherein
   said jacket part has an inside diameter slightly larger than an outside diameter of a region of said filter pot surrounded by said jacket part.

3. A filter element according to claim 1 wherein
   said cover part has at least one groove-shaped depression on an inner surface thereof facing said free interior for receiving adhesive material for forming an adhesive bond in an end region of said filter medium adjacent said cover part.

4. A filter element according to claim 3 wherein
said cover part comprises two groove-shaped depressions extending parallel laterally to a central region of said cover part, being spaced from one another and having dovetail-shaped cross sections forming widening bases thereof.

5. A filter, comprising:
a filter housing having an inner housing chamber extending along a longitudinal axis between a housing bottom and a housing cover;
a filter element within said filter housing, including
 a filter pot delineating a circular cylindrical interior with an inside wall and having a bottom part with a fluid port and a cover part opposite the bottom part;
 a filter medium adjoining said inside wall of said filter pot and being a circular cylindrical body with a central region forming a free interior;
 fluid passages in said inside wall of said filter pot encompassing said filter medium;
 a ring body connecting said cover part and said inside wall of said filter pot, said ring part having a jacket part extending axially along an end section of said inside wall and having an end part overlapping an end edge of said inside wall and an edge of said cover part and extending radially inwardly;
 interacting first and second catches on said end part of said ring body and on said cover part, respectively, forming a snap connection between said end part and said cover part, said first catch being a radially projecting rib, said second catch being an annular groove; and
 a stepped periphery on said cover part having first, second and third steps proceeding in order from an outer end of said cover part, said first step having an outside diameter corresponding to an outside diameter of said jacket part, said second step being radially inside said first step, said third step being offset radially inwardly of said second step, said annular groove being machined into said third step, said second step having radial and axial dimensions such that, with said ring body connected to said cover part and said inside wall, said end part of said ring body and said second step form an annular groove providing a seal for an O-ring to seal said cover part relative to a filter housing holding said filter pot;
a housing fluid inlet and a housing fluid outlet on said housing bottom, said housing fluid inlet having a seat receiving a filter pot fluid inlet on a bottom part of said filter element; and
an end of said housing chamber spaced a distance from said housing bottom that is substantially equal in an axial direction to a distance of said outer end of said cover part from said housing bottom.

6. A filter according to claim 5 wherein
said jacket part has an inside diameter slightly larger than an outside diameter of a region of said filter pot surrounded by said jacket part.

7. A filter according to claim 5 wherein
said cover part has at least one groove-shaped depression on an inner surface thereof facing said free interior for receiving adhesive material for forming an adhesive bond in an end region of said filter medium adjacent said cover part.

8. A filter according to claim 7 wherein
said cover part comprises two groove-shaped depressions extending parallel laterally to a central region of said cover part, being spaced from one another and having dovetail-shaped cross sections forming widening bases thereof.

\* \* \* \* \*